United States Patent [19]
Finlay

[11] Patent Number: 4,857,349
[45] Date of Patent: Aug. 15, 1989

[54] APPARATUS FOR ROLLING CIRCULAR DOUGH PRODUCT

[75] Inventor: Patrick A. Finlay, Slough, United Kingdom

[73] Assignee: Alkmar Products Limited, Beaconsfield, United Kingdom

[21] Appl. No.: 226,534

[22] Filed: Jul. 29, 1988

Related U.S. Application Data

[63] Continuation-in-part of Ser. No. 864,344, filed as PCT GB85/00358 on Aug. 12, 1985, published as WO86/01078 on Feb. 27, 1986, abandoned.

[30] Foreign Application Priority Data

Aug. 14, 1984 [GB] United Kingdom ................ 8420629

[51] Int. Cl.[4] .............................. A23P 1/0; A21C 3/02; B29C 43/08
[52] U.S. Cl. .................................... 426/502; 425/363; 425/366; 425/367; 425/383; 425/394; 425/402
[58] Field of Search ............... 425/374, 363, 367, 363, 425/383, 394, 406, 324.1, 337, 366, 393, 400, 402; 426/502, 496; 99/353, 426, 427, 432, 439

[56] References Cited

U.S. PATENT DOCUMENTS

| 55,718 | 8/1866 | Sanders | 425/374 |
|---|---|---|---|
| 784,111 | 3/1905 | Lautner | 425/374 |
| 822,913 | 6/1906 | Boss | 241/46.15 |
| 1,568,820 | 1/1926 | Fenlayson | 425/374 |
| 1,628,828 | 5/1927 | Denmead | 425/265 |
| 4,009,857 | 3/1977 | Delmas | 249/102 |
| 4,349,158 | 9/1982 | Broman | 241/46.15 |
| 4,375,349 | 3/1983 | Yrbanek | 425/324 |
| 4,435,145 | 3/1984 | Abrams | 425/374 |

Primary Examiner—Willard Hoag
Attorney, Agent, or Firm—Spencer & Frank

[57] ABSTRACT

Method and apparatus for rolling dough including rotatable support disc in cooperation with a rotatable obtuse conical roller, means being provided to hold the conical roll spaced above the disc and thereby determine the thickness of the rolled product.

22 Claims, 3 Drawing Sheets

APPARATUS FOR ROLLING CIRCULAR DOUGH PRODUCT

This application is a continuing-in-part of application of application Ser. No. 864,344 filed as PCT GB85/00358 on Aug. 12, 1985, published as WO86/01078 on Feb. 27, 1986, and now abandoned.

BACKGROUND OF THE INVENTION

The present invention relates to an apparatus for use in making dough products and more particularly to an apparatus in making dough products that are of a circular configuration.

Many people throughout the world, particularly people living in Asia, or of Asiatic origin, make their own dough products on a dialy basis. These dough products are most often in the form of round substantially flat pieces of dough which are appropriately cooked. Examples of such dough products are chapati, puri, paratha, roti, nan, tortilla, papadams and pancakes. Usually the housewife makes the dough products each evening, and this involves the steps of mixing the appropriate dough, and then using a rolling pin and a flat surface to roll appropriate portions of the dough to the required circular configuration and the desired thickness. The circular dough portions are then cooked appropriately.

In many instances it is a sign of a good housewife that all the dough products that she makes are of precisely the same diameter and precisely the same thickness and have perfect circularity. This, of course, involves a considerable amount of skill, and also occupies a considerable amount of time, since it is difficult to roll a perfectly circular dough element from a portion of dough.

SUMMARY OF THE INVENTION

The present invention seeks to provide an apparatus that may be utilised in the production of circular dough products of the type generally described above.

According to one aspect of this invention there is provided an apparatus for use when manufacturing a substantially circular dough product, said apparatus comprising means defining a planar surface, roller means adapted to cooperate with said planar surface and defining a rolling line in the region of the roller closest to said planar surface, and means for effecting a relative movement between said rolling line and said planar surface in a rotational manner about an axis extending perpendicularly to said planar surface, with an associated rotation of said roller about the axis of the roller.

Preferably said planar surface is defined by a turntable.

In one embodiment means are provided for moving said roller over a linear path, said roller extending, at one point on said linear path, substantially from the axis of rotation of said turntable towards the periphery of the turntable, means also being provided to effect a rotation of the turntable. Conveniently said means to effect rotation of the turntable are adapted to effect a stepwise indexing rotation of the turntable.

In an alternative preferred embodiment said roller is in the form of a conical roller, the apex of the cone being at or substantially adjacent the axis of rotation of the turntable, the base of the roller being substantially adjacent the periphery of the turntable.

In accordance with another aspect of the invention, the conical roller has an obtuse apex. Such a roller, while appearing to be inconveniently large, possesses a superior rolling effect. Prior conical rollers with acute angle apexes when used to roll dough on a turntable have been found to have a tendency for the dough to cling to the outer surface, with the dough thus being lifted up by the turntable in an undesirable manner, and in extreme causes the dough ends un coated evenly around the roller rather than being in the form of an even disc on the turntable. By providing a conical roller having an obtuse apex in the apparatus of the invention, the dough has a surprisingly reduced tendency to cling to the roller and thus a far superior rolled product is obtained.

Preferably barrier means are provided between the turntable and the rolling line on the roller to define the outer periphery of a desired volume as the roller and turntable rotate. The use of such a barrier may enable a dough product of a desired radius and perfect circularity to be produced. Conveniently said barrier means is formed by an elevatable barrier element normally recessed into the turntable.

A plurality of coaxial barrier elements may be provided.

Preferably the or each barrier comprises a ring shaped element with a plurality of lugs which extend into the space under the turntable, there being cam means within said space selectively operable to raise a barrier.

Alternatively said barrier means is formed by a lip formed on the base of the conical roller element. Conveniently said barrier means may be shaped to create a scalloped edge on a circular dough product formed on the apparatus.

A preferred apparatus may incorporate means to adjust the spacing between the rolling line and turntable. The use of such a feature may facilitate the production of dough products of a desired predetermined thickness. Preferably said adjusting means comprise cam means to raise and lower the turntable relative to the roller.

Advantageously means are provided for introducing a predetermined quantity of dough onto the turntable, said means comprising apparatus for injecting a predetermined quantity of dough through a hollow support rod extending along the axis of the conical roller, said dough being ejected from an aperture at or immediately adjacent the apex of said conical roller.

Conveniently means are provided for depositing a portion of dough constituting a predetermined quantity of dough on the turntable, and said depositing means may comprise a piston and cylinder device, the cylinder having one open end through which dough may be introduced to cylinder, and a piston to eject the dough from the cylinder.

Conveniently means are provided for rotatably driving the roller, and/or for rotatably driving the turntable, such as manually or treadled operated means or a motor.

Preferably said rolling line is substantially parallel with the said planar surface, but alternatively said rolling line may be at an angular inclination to the said planar surface.

This invention also relates to a method of creating a dough product, said method comprising the steps of mixing dough, placing a predetermined quantity of dough on a planar surface of an apparatus according to said one aspect of the invention and effecting a relative rotational movement between the planar surface and the roller of the apparatus about an axis perpendicular to the planar surface whilest simultaneously effecting a rotation of the roller about the axis of the roller to form a substantially circular element of dough, and finally cooking the resultant dough element.

BRIEF DESCRIPTION OF THE DRAWINGS

In order that the invention may be more readily understood, and so that further features thereof may be appreciated, the invention will now be described by way of example with reference to the accompanying drawings in which.

DESCRIPTION OF THE PREFERRED EMBODIMENT

Figure 1:
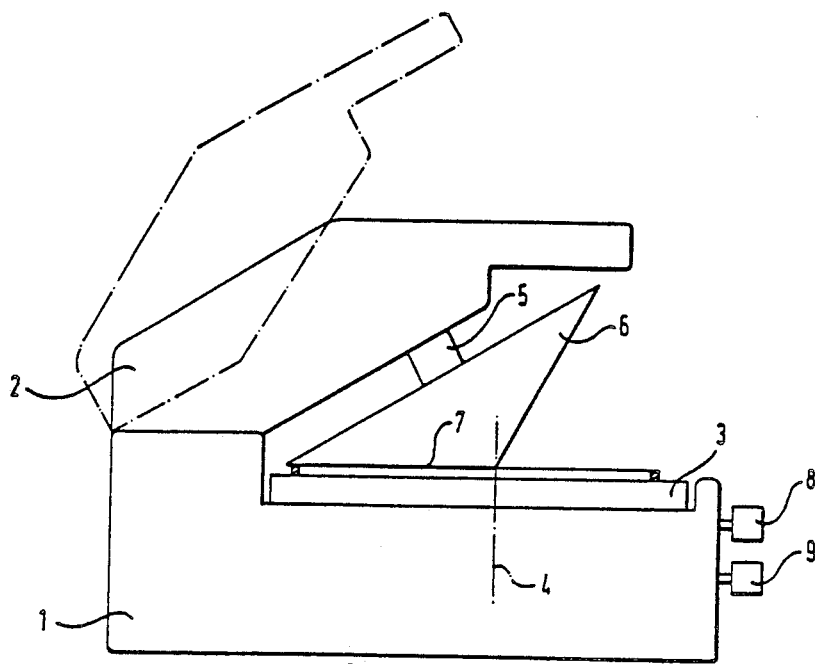
FIG. 1 is a side view of one embodiment of an apparatus in accordance with the invention.
Figure 2:
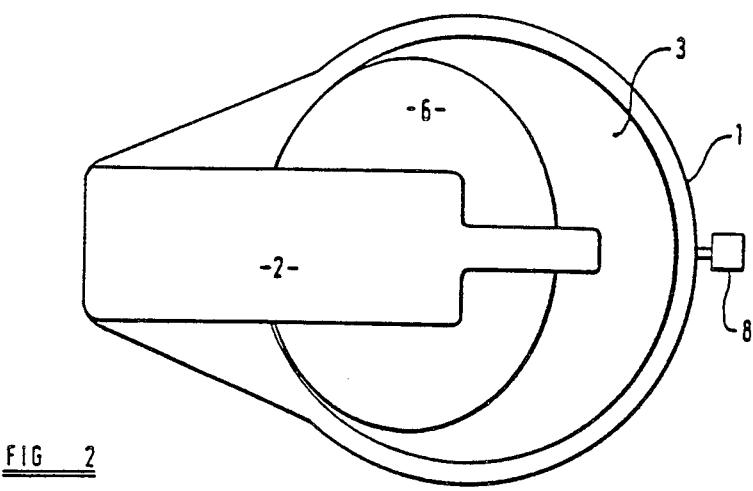
FIG. 2 is a top view of the embodiment of FIG. 1.

Referring initially to FIGS. 1 and 2 of the accompanying drawings an electrically operated embodiment of the invention comprises a housing which has a lower or base part 1 and an upper or cone support part 2 that is pivotally connected to the base part 1. The upper part is in a horizontal position during operation of the apparatus, as shown in FIG. 1, but may be moved hingedly to an elevated position (shown in phantom in FIG. 1) when dough is being introduced into the apparatus.

The base of the housing supports a horizontal turntable 3 that is mounted for rotation about a vertical axis 4.

The upper housing part 2 supports, by means of an inclined shaft 5, a rotatable roller 6 which has a conical roller surface. The roller 6 is so located that the apex of the cone is obtuse and located immediately adjacent the vertical axis 4, and the base of the cone is adjacent the periphery of the turntable 3.

The lowermost part of the cone, that is to say the part of the cone immediately adjacent the turntable 3, defines a rolling line 7 which is substantially horizontal.

When the above described apparatus is utilised a portion of dough is located on the turntable, and the turntable is then rotated. The dough is engaged by the roller 6, which also rotates, and the dough is thus rolled to form a circular dough product.

The base of the housing 1 is provided with two control knobs 8, 9 which can be operated to facilitate the manufacture of dough products of predetermined diameter, and perfect circularity, and predetermined thickness, as will be described hereinafter in greater detail.

Figure 3:
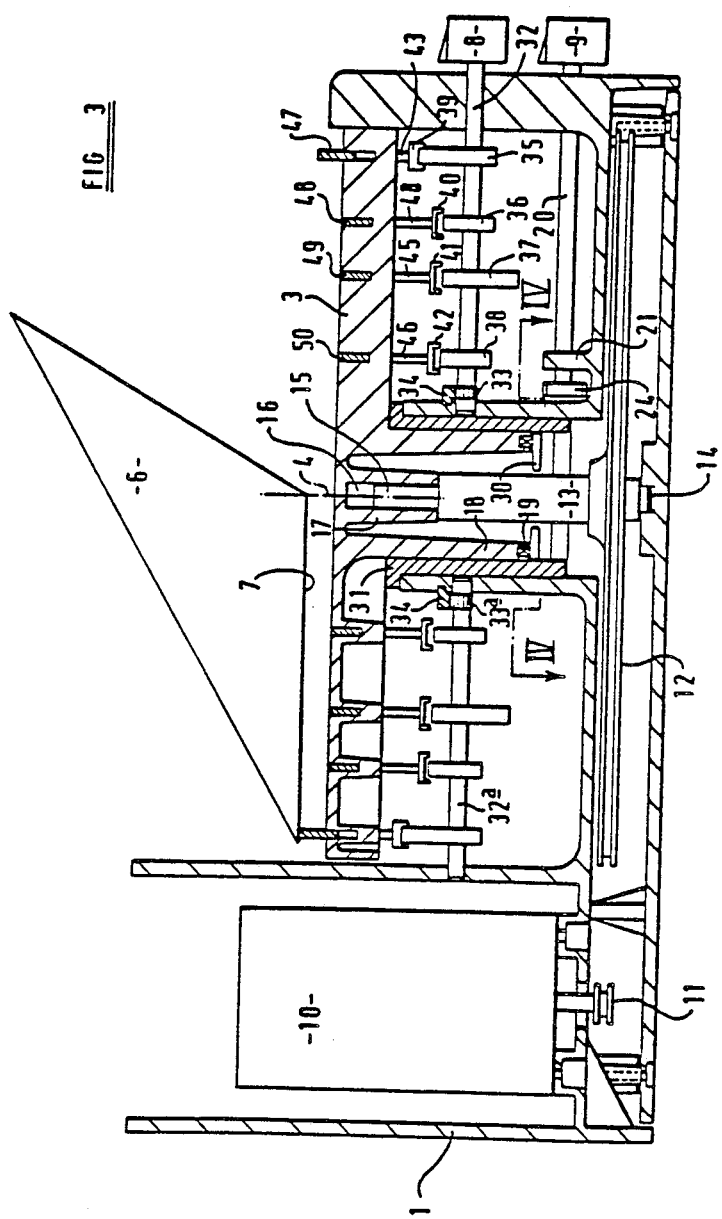
FIG. 3 is a sectional view of part of the apparatus of FIGS. 1 and 2.
Figure 4:
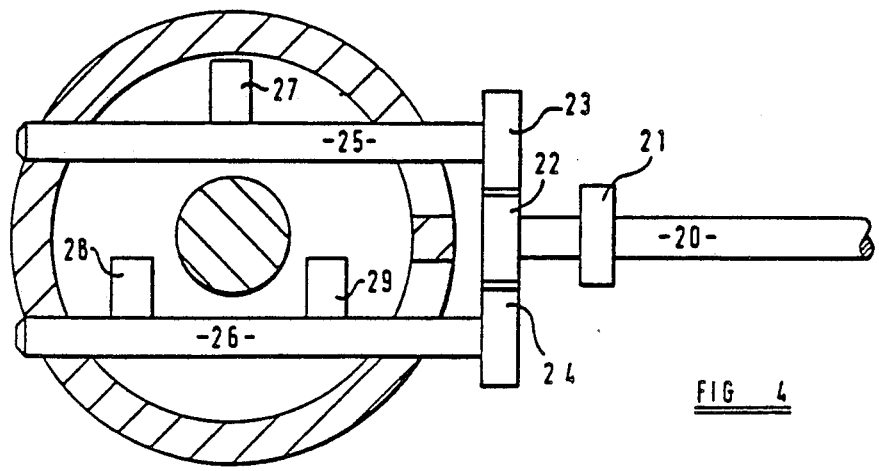
FIG. 4 is a plan view of part of the apparatus on the line IV—IV in FIG. 3.

Turning now to FIGS. 3 and 4 it can be seen that the base 1 of the housing contains an electric motor 10 which is appropriately mounted in position. The motor 10 drives a pulley 11 which is connected by means of a drive belt (not shown) to a further pulley 12. The pulley 12 is drivingly mounted on a vertical shaft 13 which is supported, at its lower end, by an appropriate bearing 14.

The upper end of the shaft 13 is in the form of a square drive 15, and this drive is accommodated within a square sectioned recess 16 formed in a downwardly extending spigot 17 that is formed integrally with the rotatable turntable 3.

The turntable 3 is provided with a second hollow downwardly extending spigot 18 that is coaxial with the first spigot 47. The lowermost portion of the spigot 18 is provided with a bearing constituted by an annular member 19 of material having a low co-efficient of friction such as polytetrafluorethylene.

Referring now also to FIG. 4, it will be seen that the control knob 9 is mounted on a horizontal shaft 20 which passes through an appropriate guide 21 formed by part of the base 1 of the housing, and terminates in a toothed wheel 22. The toothed wheel 22 engages two further toothed wheels 23, 24 which are mounted on shafts 25, 26 respectively. These shafts carry a plurality of cam members 27–29, and the arrangement is such that, on rotation of the knob 9, the shafts 25, 26 rotate bringing the cam members 27–29 into contact with the undersurface of a thrust plate 30 which is of annular configuration and which surrounds the vertical shaft 13, and which is located under the lowermost end of the spigot 18. The cams 27–29 apply an even up-thrust, and the thrust plate 30 is brought into contact with the bearing 19 and thus moves the turntable upwardly. The outermost walls of the spigot 18 are of cylindrical configuration and are contained within a cylindrical bore defined by an element 31 present in the base of the housing 1. Thus the turntable 3 will move upwardly and downwardly witout any "wobble" being introduced. As the turntable 3 rises and falls on operation of the knob 9, the turntable is still driven continuously by the engagement of the square drive 15 with the square recess 16 as described above.

It will be appreciated that by operating the knob 9 the distance between the rolling line 7 and the surface of the turntable 3 may be selectively adjusted.

The control knob 8, mentioned above, is mounted on a horizontal shaft 32 which terminates with a toothed portion 33. The toothed portion engages the undersurface of a toothed horizontal ring 34 that is located concentrically with the axis 4. The toothed ring 34 engages a toothed portion 33a on at least one further corresponding horizontal shaft 32a. In a preferred embodiment of the invention three further shafts are provided corresponding to the shaft 32, the four shafts thus being spaced at 90° intervals about the vertical axis 4. The following description relating to shaft 32 will apply, mutatis mutandis to each of the corresponding shafts.

The shaft 32 carries four cam members 35, 36, 37, 38. Each cam member has protruding lobe, and the protruding lobes are angularly offset from one another so that any any particular position of the control knob 8 only one lobe will be in an elevated position.

Located immediately above each cam 35–38 is a horizontal annular cam follower 39–42 respectively. Each annular cam follower is connected by means of a plurality of connecting lugs 43–46 respectively to a diameter selecting ring 47–50 respectively. Each diameter selecting ring is normally accommodated within an appropriate recess formed within the turntable 3, with the upper surface of the ring flush with the upper surface of the turntable 3. Each ring has said plurality of lugs extending downwardly from the lower part of the ring, through an appropriate channel formed in the turntable 3, into the space beneath the turntable. The annular cam follower is then connected to the bottoms of the protruding lubs.

When the control knob 8 is rotated appropriately a lug of a selected cam on each of the shafts 32, 32a etc. will be brought into contact with one cam follower, thus elevating that cam follower. Since the elevating pressure is applied to the cam follower at plurality of spaced positions the cam follower moves upwardly whilst remaining in a horizontal condition. The upward movement of the cam follower is transmitted, by means of the associated lugs, to the corresponding diameter selected ring, and that diameter selecting ring is thus elevated by a selected distance above the surface of the turntable 3.

By carefully actuating the knobs 8 and 9 it will be appreciated that it is possible to control the apparatus to provide any desired distance between the rolling line 7 and the surface of the table 3 within an available range of distances, and to provide any one of four selected diameters between the axis 4 and an elevated diameter selecting ring or barrier member.

Thus it will be appreciated that, in order to make a dough product of a desired diameter and desired thickness, the control knobs 8 and 9 are operated appropriately, and then an appropriate amount of dough is located on the turntable 3. The turntable 3 is then caused to rotate, by means of actuation of the electric motor 10, and the roller 6 will rotate, and the dough will be rolled between the rolling line (that is to say the line of contact between the roller and the dough present on the turntable) that extends substantially radially of the turntable relative to the axis of rotation of the turntable, and the surface of the turntable itself to form a desired dough product.

Whilst, in the described embodiment, the turntable may be moved upwardly and downwardly, it is to be appreciated that this is an optional feature. In a possible alternative construction the roller 6 may be spring moutned on the upper housing part 2, and then the thickness of the final dough product may be regulated by appropriately selecting the distance by which the diameter regulating member protrudes above the upper surface of the turntable 3.

In a further alternative embodiment of the invention the supporting shaft 5 for the roller may be made hollow, and dough may be introduced to the turntable through the hollow shaft.

Whilst, in the described embodiment, the turntable is rotatably driven and the roller 6 is merely mounted in such a way that it is free to rotate, it is to be appreciated that in alternative embodiments of the invention both the turntable and the roller may be driven, or the roller may be driven and the turntable may merely be free to rotate.

Figure 5:
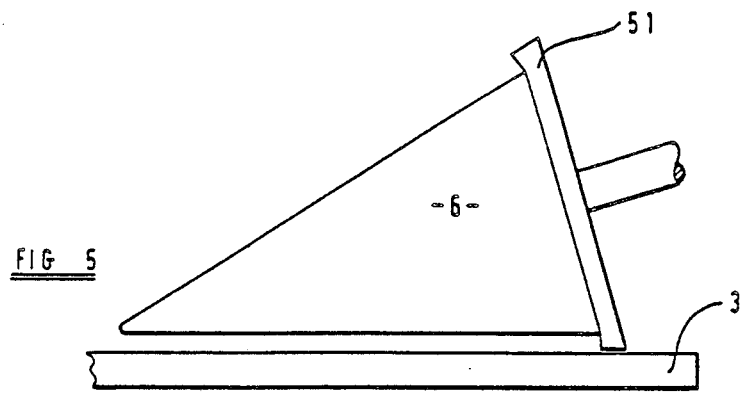
FIG. 5 is a side view of part of an alternative embodiment of the invention.

FIG. 5 illustrates a further alternative embodiment of the invention in which a planar turntable 3 is utilised, but the conical roller 6 is provided with a protruding lip 51 adjacent the base thereof. As can be seen, the lip 51 is intended to be brought into contact with the turntable 3, and when the lip is positioned in this way, the rolling line of the roller 6 is spaced a predetermined distance above the upper surface of the turntable 3. Thus again the combination of the turntable and the roller effectively define a predetermined volume corresponding to the desired volume of a circular dough product.

Whilst the embodiments illustrated above show the rolling line of the roller 6 extending in a direction substantially parallel to the upper surface of the turntable 3 it is to be understood that there may be an angular inclination between the rolling line and the upper surface of the turntable, thus enabling dough products to be formed which are thicker at the centre than at the periphery, or which are thicker at the periphery than at the centre.

Since the apparatus will be utilised with dough products it is, of course, preferred, to utilise non-stick materials on the a operative component of the apparatus to facilitate the use of the apparatus. Thus the components described above may be coated with "Telfon" (Registered Trade Mark) or some other non-stick material or may be manufactured from a material having non-stick properties such as nylon.

It would, of course, be possible to modify one or more of the movable annular barrier members 47-50 or the lip 51 provided on the cone 6 shown in FIG. 5 so that the periphery of each dough product is appropriately crimped.

Figure 6:
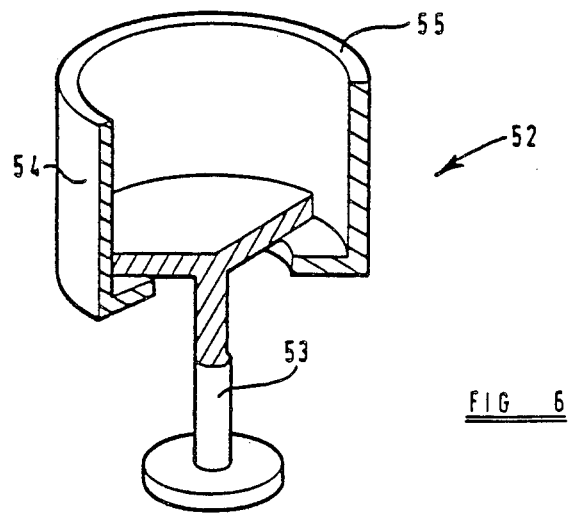
FIG. 6 is a perspective view, partly cut-away, of a dough dispensing device for use with the apparatus of the invention.

Whilst reference has been made to the use of an apparatus for injecting dough material through a hollow drive tube for the roller, in simple embodiments of the invention such injecting means may be omitted. In order to enable a person operating the machine to place a portion of dough of the correct size on the turntable a simple piston and cylinder device 52, as shown in FIG. 6 may be provided. When piston 53 of the device is in the fully retracted position, as illustrated, dough may be placed in the hollow cavity defined by the cylinder 54, the quantity of dough being just sufficient to fill the cylinder level with the mouth 55 of the cylinder. The piston may then be operated to eject the dough onto the turntable.

Whilst the invention has been described with reference to specific embodiments that utilise conical rollers, it is to be appreciated that cylindrical rollers may be utilised. Also, whilst the invention has been described with reference to an embodiment in which the rolling line defined between the roller and turntable extends radially from the axis of rotation of the turntable to a point adjacent the periphery of the turntable, so that the rolling line is substantially stationary relative to the axis of the turntable at one end thereof, but moves peripherally of the turntable at the other end, various alternative arrangements could be utilised. Thus, for example, a roller could be provided that can be moved backwards and forwards over a short predetermined distance, the rolling line in the middle of such a movement extending substantially radially from the axis of rotation of a turntable towards the periphery thereof. In such an embodiment the turntable may be provided with means for rotating the turntable, or with means for indexing the turntable. It is to be appreciated that this combination of movements will closely resemble the rolling movement provided by the described conical roller arrangements.

In operation of the device the roller line must move in a clockwise or anticlockwise manner relative to the planar surface on which the dough rests. If the planar surface is a turntable, then the turntable can rotate relative to the roller. On the other hand if the planar surface is fixed, then the entire roller can rotate about a vertical axis normal to said plane, as well as rotating about the axis of the roller.

Whilst the invention has been described with reference to an embodiment which is driven by an electric motor it is to be appreciated that simple embodiments of the invention may be operated manually or by means of a treadle.

In utilising an apparatus in accordance with the invention initially a sufficient quantity of dough will be mixed, and then successive dough elements will be located on the turntable and will be formed into circular dough elements of a predetermined thickness. The dough elements may ten be cooked in the appropriate manner.

I claim:

1. A method of creating a circular dough product using an apparatus which includes a turntable having an upper planar surface, a turntable axis of rotation extending perpendicularly to the upper surface and a periphery surrounding the turntable axis of rotation and a conical roller having a base, an apex and a roller axis of rotation, a conical roller having a base, an apex defining an obtuse angle, a conical roll surface between the apex and the base, and a roller axis of rotation, and being located in relation to the upper surface so as to define a rolling line in a region of the roller closest to the upper surface, the turntable being rotatable about the turntable axis of rotation, said method comprising the steps of:

mixing the dough, placing a predetermined quantity of the dough on the upper surface, retaining the roller and the turntable at a predetermined spacing with a member therebetween to enable the roller to cooperate with the turntable to roll a portion of dough on the upper surface.

after said step of placing, effecting a relative rotational movement between the upper surface and the roller about the turntable axis of rotation, simultaneously with said step of effecting a relative rotational movement between the upper surface and the roller, effecting a rotation of the roller about the roller axis of rotation to form a substantially circular element of dough, the obtuse angle of the apex of the roller being of sufficient degree that the dough will not cling to the roll surface, after said steps of effecting relative rotation movement, cooking the resultant dough element.

2. A method for creating a dough product using an apparatus which includes a turntable having an upper surface and turntable axis of rotation extending perpendicularly to the upper surface and a conical roller having a base, an apex defining an obtuse angle and a roller axis of rotation extending symmetrically through the base and the apex, the apex being located substantially adjacent to the axis thereby to define a rolling line in a portion of the roller closest to the upper surface extending from the apex to the base, the turntable being rotatable about the turntable axis of rotation to effect a relative movement between the rolling line and the turntable within an associated rotation of the roller about the roller axis of rotation, the method comprising the steps of:

mixing dough, placing a predetermined quantity of dough on the turntable, retaining the roller and the turntable at a predetermined spaced therebetween along the rolling line with a member between a conical surface of the roller and the upper surface of the turntable, and during said step of retaining, effecting a relative rotational movement between the turntable and the roller about the turntable axis while simultaneously effecting a rotation of the roller about the roller axis to form a substantially circular element of dough, the obtuse angle of the apex of the roller being of sufficient degree that the dough will not cling to the conical surface of the roller, and cooking the result dough element.

3. An apparatus for use when manufacturing a substantially circular dough product, said apparatus comprising:

a turntable having an upper surface and a turntable axis of rotation extending perpendicularly to said upper surface a conical roller having a base, an apex defining an obtuse angle, a conical roll surface between said apex and said base, and a roller axis of rotation extending symmetrically through said base and said apex, said apex being located substantially adjacent said axis, thereby to define a rolling line in a portion of said roller closest to said upper surface extending from said apex to said base, said turntable being rotatable about said turntable axis of rotation to effect a relative movement between said rolling line and said turntable with an associated rotation of said roller about said roller axis of rotation; and means for retaining said roller and said turntable at a predetermined spacing therebetween along said rolling line to enable said roller to cooperate with said turntable to roll a portion of dough on said planar surface, said obtuse angle being of sufficient degree that the portion of dough will not cling to said roll surface.

4. An apparatus according to claim 3 wherein means are provided for introducing a predetermined quantity of dough onto the turntable, said means comprising apparatus for injecting a predetermined quantity of dough through a hollow support rod extending along the axis of the conical roller, said dough being ejected from an aperture at or immediately adjacent the apex of said conical roller.

5. An apparatus according to claim 3 wherein the roller and turntable can be moved between a spaced apart inoperative position, and an operative position.

6. An apparatus according to claim 5 wherein means are provided to permit the selective adjustment of the spacing between the roller and the turntable when in the operative position.

7. An apparatus according to claim 3 wherein barrier means are provided between the turntable and the rolling line on the roller to define an outer periphery of a desired volume in which the dough is formed, as the roller and turntable rotate.

8. An apparatus according to claim 7 wherein said barrier means is formed by an elevatable barrier element normally recessed into the turntable.

9. An apparatus according to claim 7 wherein said barrier means is formed by a lip formed on the base of the conical roller.

10. An apparatus as in claim 3, wherein said means for retaining includes a barrier extending between the conical surface of the roller and said turntable, actuatable while said turntable is rotable.

11. An apparatus as in claim 3, wherein said means for retaining includes a cam, actuable while said turntable is rotating.

12. An apparatus for use when manufacturing a substantially circular dough product, said apparatus comprising:

a turntable having an upper planar surface, a turntable axis of rotation extending perpendicularly to said upper planar surface and a periphery surrounding said turntable axis of rotation;

a conical roller having a base, an apex defining an obtuse angle, and a roller axis of rotation, and being located in relation to said planar surface so as to define a rollingl ine in a region of said roller closest to said planar surface, said turntable being rotatable about said turntable axis of rotation to effect a relative movement between said rolling line and said turntable with an associated rotation of said roller about said roller axis of rotation;

means for retaining said roller and said turntable at a predetermined spacing therebetween in said region to enable said roller to cooperate with said turntable to roll a portion of dough on said planar surface; and a lip on said base forming a barrier to the portion of dough, said lip defining an outer periphery of a desired volume between said turntable and said rolling line as said roller and said turntable rotate.

13. An apparatus according to claim 12 wherein said roller is in the form of a conical roller, the apex of the cone being substantially adjacent the axis of rotation of the turntable, the base of the roller being substantially adjacent the periphery of the turntable.

14. An apparatus for use when manufacturing a substantially circular dough product, said apparatus comprising:

a turntable having an upper planar surface, a turntable axis of rotation extending perpendicularly to said upper planar surface and a periphery surrounding said turntable axis of rotation;

a conical roller having a base, an apex and a roller axis of rotation, and being located in relation to said planar surface so as to define a rolling line in a region of said roller closest to said planar surface, said turntable being rotatable about said turntable axis of rotation to effect a relative movement between said rolling line and said turntable with an associated rotation of said roller about said roller axis of rotation;

means for retaining said roller and said turntable at a predetermined spacing therebetween in said region to enable said roller to cooperate with said turntable to roll a portion of dough on said planar surface; and barrier means for forming a barrier to the portion of dough, said barrier means including an elevatable barrier recessed in said turntable below said planar surface, said barrier being elevatable above said planar surface between said rolling line and said planar surface: (a) to define an outer periphery of a desired volume between said turntable and said rolling line as said roller and said turntable rotate and (b) so that said roller rolls on said barrier when rolling on the portion of dough thereby to define said predetermined spacing between said roller and said planar surface at the elevation of said barrier.

15. An apparatus as in claim 14, wherein said barrier means comprising means for adjusting the amount of elevation of said barrier above said plane, thereby to define said predetermined spacing between said roller and said planar surface at said amount of elevation.

16. An apparatus as in claim 14, wherein said barrier mean comprises a plurality of elevatable barriers recessed in said turntable below said planar surface in respective radially spaced concentric rings centered at said turntable axis of rotation, each of said barriers being selectably elevatable above said planar surface: (i) to define an outer periphery of a selected volume radially interior of the selected barrier and between said turntable and said rolline line as said roller and said turntable rotate and (ii) so that said roller rolls on the elevated barrier when rolling on the portion of dough thereby to define said predetermined spacing between said roller and said planar surface at the elevation of said elevated barrier.

17. An apparatus as in claim 16, wherein said barrier means comprising means for adjusting the amount of elevation of said elevated barrier above said plane, thereby to define said predetermined spacing between said roller and said planar surface at said amount of elevation.

18. An apparatus for use when manufacturing a substantially circular dough product, said apparatus comprising:

a turntable having an upper planar surface, a turntable axis of rotation extending perpendicularly to said upper planar surface and periphery surrounding said turntable axis of rotation;

a conical roller having a base, an apex and a roller axis of rotation, and being located in relation to said planar surface so as to define a rolling line in a region of said roller closest to said planar surface, said turntable being rotatable about said turntable axis of rotation to effect a relative movement between said rolling line and said turntable with an associated rotation of said roller about said roller axis of rotation, means for retaining said roller and said turntable at a predetermined spacing therebetween in said region to enable said roller to cooperate with said turntable to roll a portion of dough on said planar surface; and means for introducing a predetermined quantity of dough onto said turntable, said introducing means comprising a hollow support rod extending along said roller axis, and means for injecting the predetermined quantity through said rod to be ejected onto said turntable from an aperture immediately adjacent said apex.

19. An apparatus for use when manufacturing a substantially circular dough product, said apparatus comprising:

a turntable having an upper surface and a turntable axis of rotation extending perpendicularly to said upper surface;

a conical roller having a base, an apex defining an obtuse angle and a roller axis of rotation extending symmetrically through said base and said apex, said base being located substantially adjacent said upper surface, thereby to define a rolling line on a portion of said roller closest to said upper surface extending from said apex to said base, said turntable being rotatable about said turntable axis of rotation to effect a relative movement between said rolling line and said turntable with an associated rotation of said roller about said roller axis of rotation; and cam means operable to cause relative movement between said turntable and said roller along said turntable axis of rotation such that said turntable and said roller having a predetermined spacing therebetween along said rolling line to enable said roller to cooperate with said turntable to roll a portion of dough on said upper surface.

20. An apparatus according to claim 19 wherein said cam means are located under said turntable, said apparatus further comprising a thrust means associated with said turntable, said cam means being rotable to engage said thrust means, thus to move said turntable along said axis of rotation, whereby said turntable is retainable at a position such that said turntable has a predetermined spacing from said roller along said rolling line to enable said roller to cooperate with said turntable to roll the portion of dough on said planar surface.

21. An apparatus as in claim 19, wherein said apex defines an obtuse angle.

22. An apparatus as in claim 19, further comprising means for rotatably driving said turntable, said rotatably driving means including a polygonal shaft engaged in a corresponding polygonal recess formed in an underside of said turntable, rotation of said cam means causing said turntable to rise and fall with the polygonal shaft sliding within said polygonal recess without leaving said polygonal recess.

* * * * *

UNITED STATES PATENT AND TRADEMARK OFFICE
CERTIFICATE OF CORRECTION

PATENT NO. : 4,857,349

DATED : August 15, 1989

INVENTOR(S) : Patrick A. Finlay

It is certified that error appears in the above-identified patent and that said Letters Patent is hereby corrected as shown below:

In the heading of the patent, under [63] the information should read --Continuation-in-part of Ser. No. 864,344, May 8, 1986, abandoned, PCT/GB85/00358 filed 8/12/1985.

Signed and Sealed this

Twenty-eighth Day of August, 1990

Attest:

HARRY F. MANBECK, JR.

*Attesting Officer*      *Commissioner of Patents and Trademarks*